ORBITAL PACKING DEVICE

Original Filed March 16, 1964 3 Sheets-Sheet 1

Inventor
John J. Bradley
by Dawson, Tilton, Fallon,
Lungmus & Alexander Attys

ORBITAL PACKING DEVICE

Original Filed March 16, 1964 3 Sheets-Sheet 2

Inventor
John J. Bradley
by Dawson, Tilton, Fallon,
Lungmus & Alexander Attys

ORBITAL PACKING DEVICE

Original Filed March 16, 1964 3 Sheets-Sheet 3

Inventor
John J. Bradley
by Ryason, Tilton, Fallon
Lungmus & Alexander Attys

United States Patent Office

Re. 28,172
Reissued Sept. 24, 1974

28,172
ORBITAL PACKING DEVICE

John J. Bradley and Ernst D. Nystrand, Green Bay, Wis., assignors to Paper Converting Machine Co., Inc., Green Bay, Wis.

Original No. 3,256,012, dated June 14, 1966, Ser. No. 352,101, Mar. 16, 1964, which is a continuation-in-part of application Ser. No. 244,815, Dec. 14, 1962, now Patent No. 3,254,889. Application for reissue Dec. 1, 1971, Ser. No. 203,921
Int. Cl. B65h *29/56*
U.S. Cl. 271—196 2 Claims

Matter enclosed in heavy brackets [ ] appears in the original patent but forms no part of this reissue specification; matter printed in italics indicates the additions made by reissue.

ABSTRACT OF THE DISCLOSURE

*An orbital packing device having a vacuum roll for sequential handling of discrete pieces of flexible web material, and a plurality of fingers mounted adjacent the roll for removing the pieces.*

*This application is a continuation-in-part of our copending application Ser. No. 244,815, filed Dec. 14, 1962, now Pat. No. 3,254,889.*

This invention relates to an orbital packing devices, and more particularly, to a device for sequentially handling discrete portions of web material to provide the same in a stack or group such as is currently employed in the distribution of paper toweling, paper napkins, etc.

The apparatus employed in the prior art for stacking or packing webs for toweling, napkins, etc., has generally been of the reciprocating type, with the attendant inefficiency characteristic of such movements. According to the invention, a rotary-type movement is featured, and further one wherein a much more gentle action is developed, particularly at the time of contact of a subsequent web with the already accumulated pack. The provision of such an improved apparatus constitutes an important objective of the invention.

Another object of the invention is to provide an orbital-type packer useful in conjunction with a vacuum roll wherein discrete web segments are transferred smoothly and sequentially from the vacuum roll to a pack, the apparatus employing a novel orbit-producing mechanism.

Other objects and advantages of the invention may be seen in the details of construction and operation set down in this specification.

The invention is explained in conjunction with an illustrative embodimet in the accompanying drawing, in which FIG. 1 is an elevational view of apparatus involving the orbital packing device of the invention, the particular apparatus shown including means for folding and severing web material for napkins intended to be continuously packed in issuing from the structure shown in FIG. 1;

Figure 1:
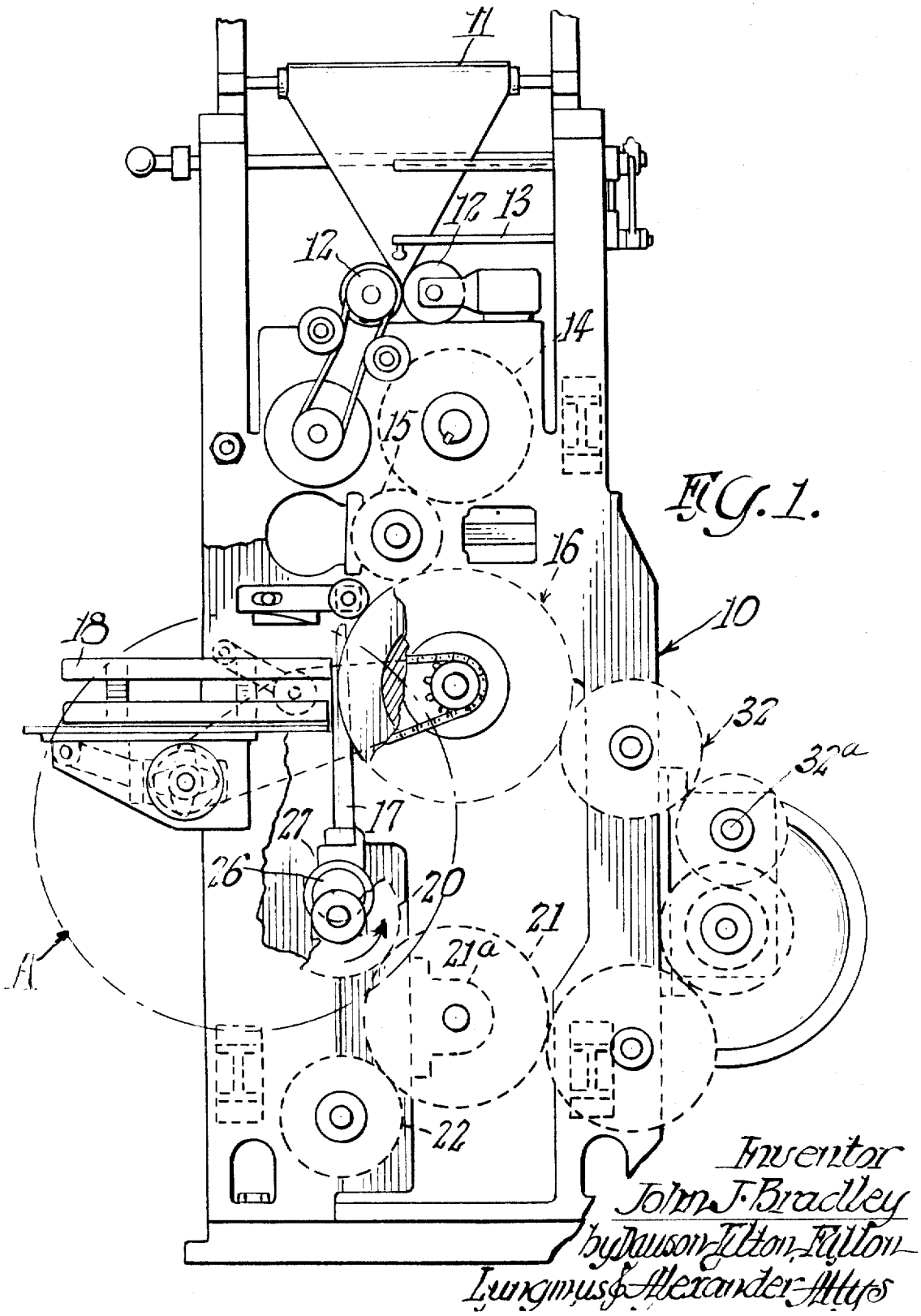

In the illustration given and with particular reference to FIG. 1, the numeral 10 designates generally the frame of a machine intended to fold, cut, and pack paper napkins. It will be immediately appreciated that a variety of other webs, fibrous or otherwise, may be advantageously handled according to the invention. However, in the illustration given, which constitutes presently the best mode known of practicing the invention, the numeral 11 designates a folding member, this being found at the extreme top of FIG. 1 wherein a continuous web is folded on itself in passing over the plow-like member 11 and thence between creasing rolls 12. The web may be contacted by a static eliminator as at 13 coupled to the frame 10.

The now-folded web is arranged to pass over a bedroll 14 suitably journaled in the frame 11 and into engagement with a cutting roll 15 wherein the web is transversely severed into discrete segments.

The severed webs pass immediately to a vacuum roll generally designated 16 (see also FIG. 2) which is equipped with hollow shaft as at 16a for the purpose of applying a vacuum to a selected portion of the periphery of the vacuum roll 16 and thereby maintain the severed webs on the roll periphery for traveling engagement therewith.

The numeral 17 (still referring to FIGS. 1 and 2) refers to fingers for removing the folded webs from the vacuum roll 16, and the numeral 18 designates ways for the stacked or packed folded webs removed from the periphery of the vacuum roll 16 under the influence of the fingers 17.

Figure 2:
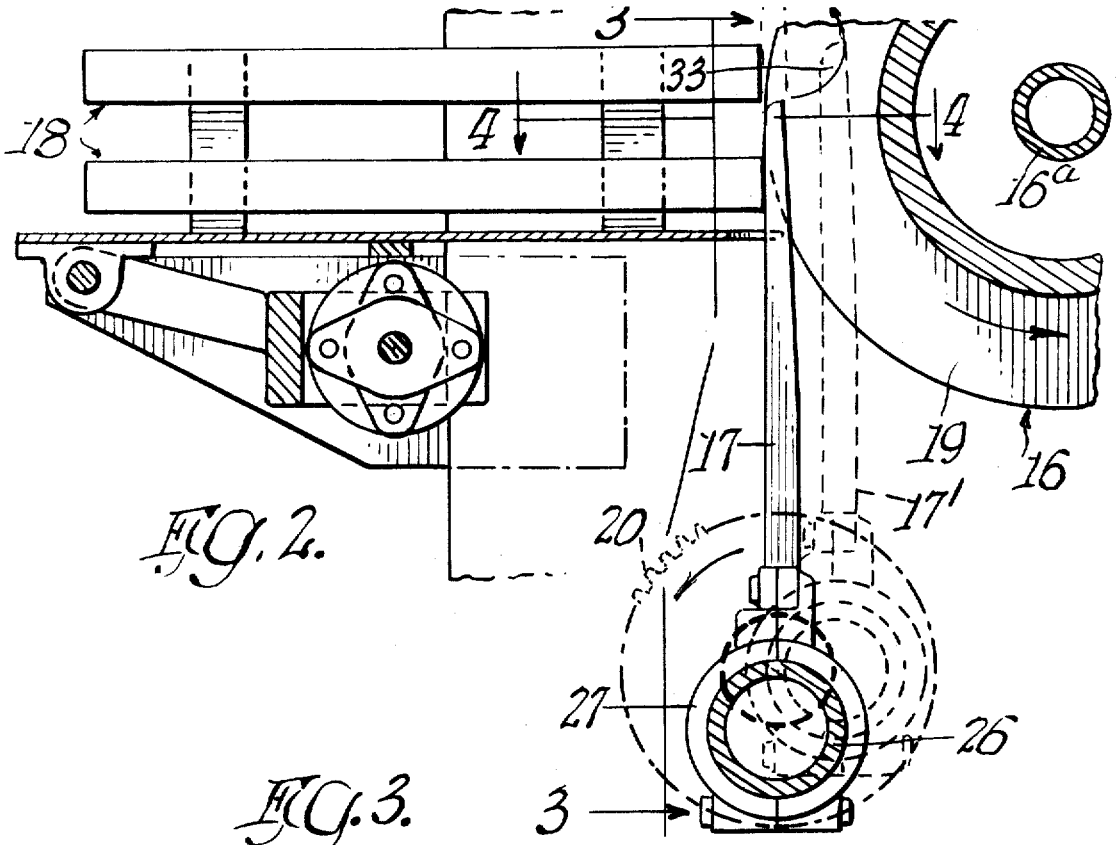
FIG. 2 is a fragmentary, enlarged portion, partially in section, of the apparatus of FIG. 1 and which is encircled and designated by the symbol A in FIG. 1.
Figure 3:
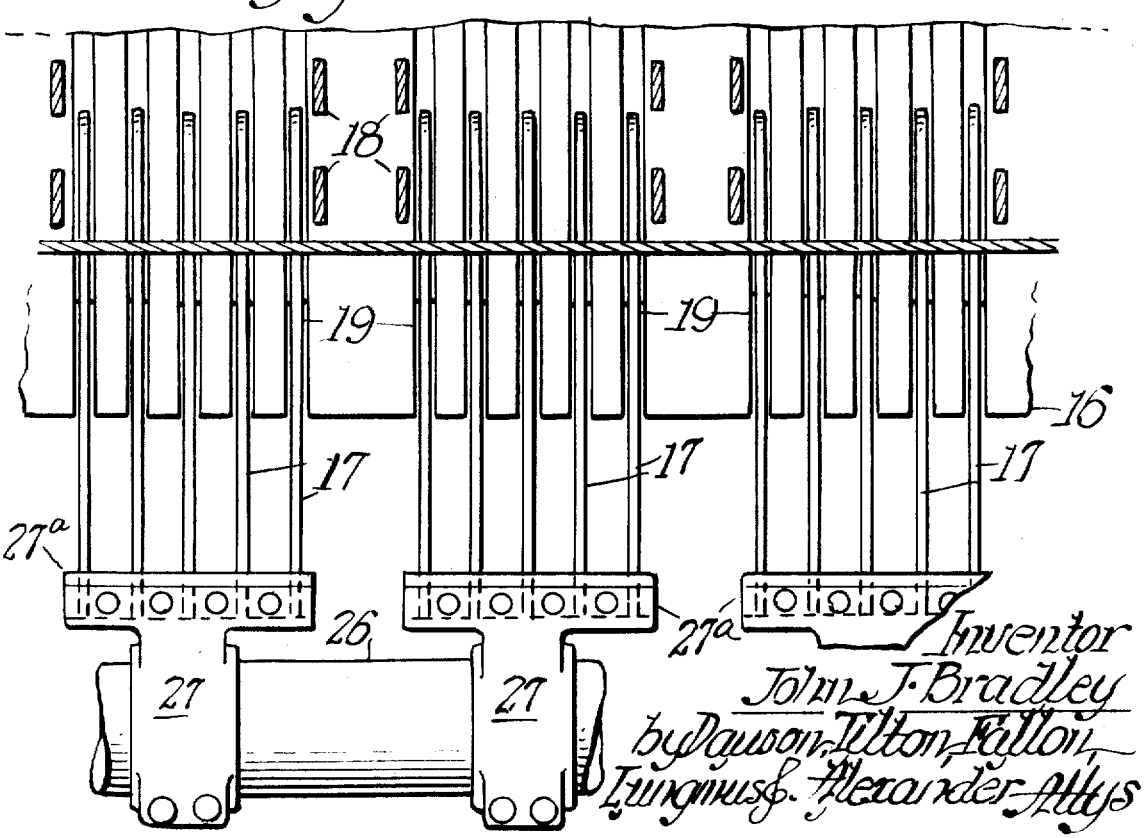
FIG. 3 is a fragmentary sectional view taken along the line 3—3 of FIG. 2.
Figure 4:
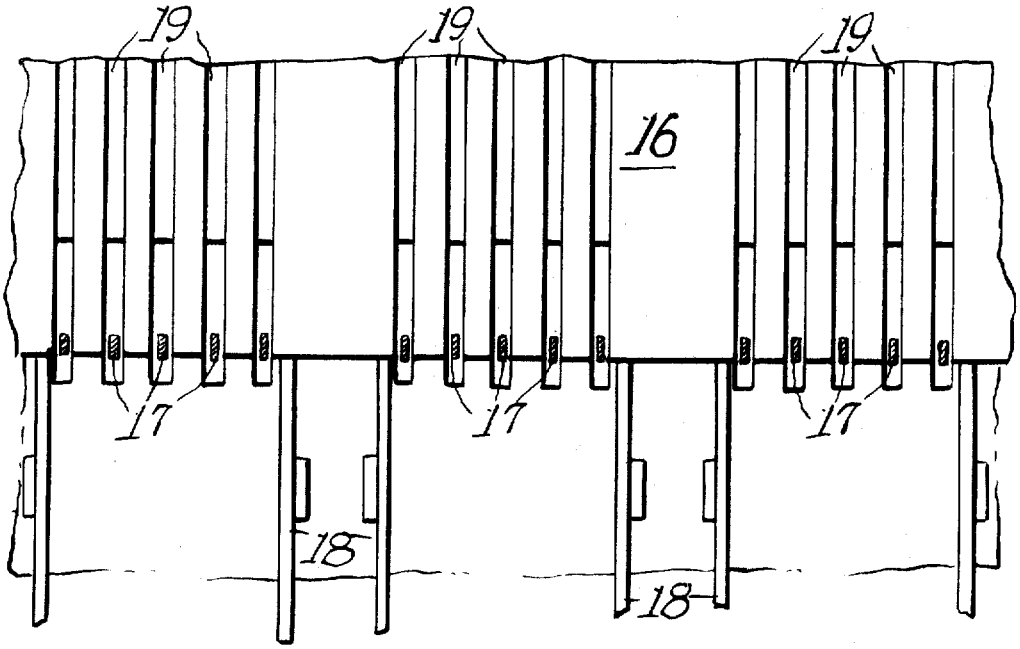
FIG. 4 is a fragmentary enlarged sectional view taken along the sight line 4—4 of FIG. 2.

Referring now to FIGS. 2 and 3, the numeral 19 designates a plurality of annular grooves provided in the periphery of the vacuum roll 16 and which communicate the source of vacuum such as a Nash watersealed vane pump (not shown) with the surface of the vacuum roll 16 so as to urge the webs against the roll 16. The fingers 17 are orbitally mounted on the frame 10 and, as can be appreciated from FIG. 2, are positioned within the annular grooves 19, alternative positions being seen in FIG. 2 with one of the positions being indicated in dotted line and designated by the numeral 17'.

Referring now to FIG. 1, the numeral 20 designates a gear (see also FIG. 5) operatively associated with the frame 10 for developing the orbital movement of the fingers 17. Still referring to FIG. 1, the numeral 21 designates a coupling or spur associated with the gear 20 and suitably journaled on the frame 10 as by a pillow block 21a. The numeral 22 indicates a stabilizing gear in toothed engagement with the gear 21 and also suitably rotatably supported on the frame 10 so as to rotate in synchronism with the gear 20, the gears 20 and 22 being substantially identical.

Figure 5:
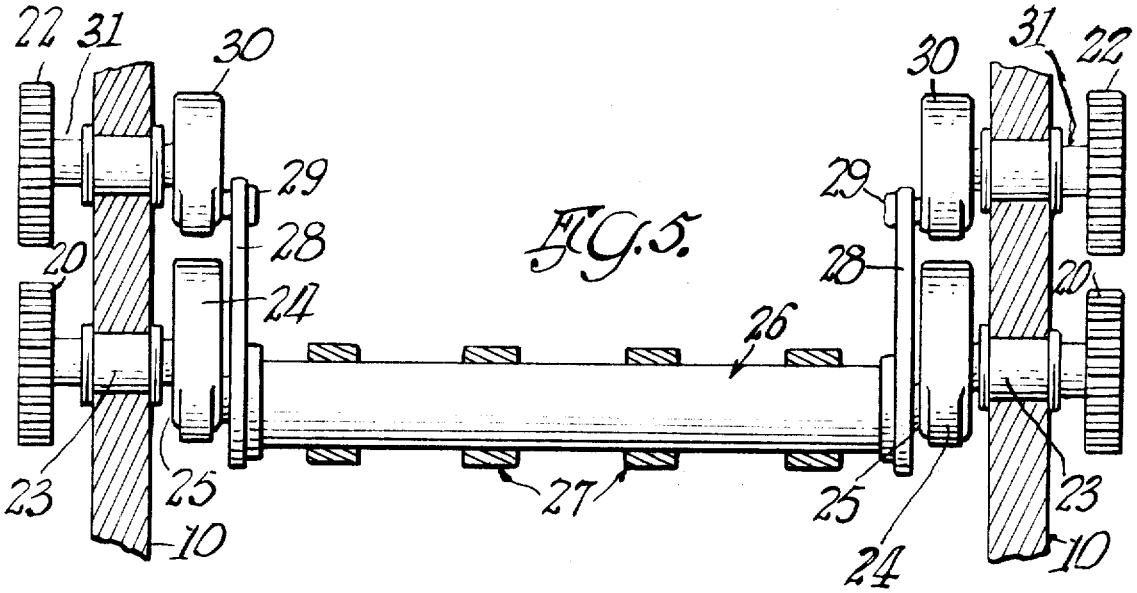
FIG. 5 is a fragmentary end elevational view, partially in section, of the orbit-producing mechanism of FIG. 1.

Now referring to FIG. 5, the numeral 23 designates the shaft or journal for the gear 20, which is seen to be rotatably mounted within the frame 10, and interiorly of the frame is equipped with a crank 24 so as to have common rotation of the crank 24 and gear 20. The crank 24 is equipped with an eccentric bearing as at 25 which rotatably supports the orbital shaft 26. The shaft 26 (see FIG. 3) is equipped with a plurality of collars, each terminating in brackets as at 27a for the purpose of rigidly suporting a plurality of fingers 17.

From the foregoing, it will be seen that an orbital movement of the shaft 26 is possible as a result of the rotation of the crank 24. Cooperating with the crank 24 in developing the orbital movement of the shaft 26 is a connecting strap 28 (see FIG. 5) which is mounted on the shaft 26 and also rotatably mounted on a pivot pin 29. The pivot pin 29 is eccentrically journaled in a second crank 30 which corresponds to the crank 24 but which is carried on a shaft 31 associated with the stabilizing gear 22. Thus, the coaction of the gearing 20–22, the cranks 24 and 30 connected by the strap 28, results in the orbital movement of the shaft 26. The gearing 20–22 is operably associated with the vacuum roll 16 by means of a gear train 32 which also is coupled to a source or rotational power as at 32a (see FIG. 1). This results in an orbital movement of the fingers 17 such as is indicated by the partial arrow 33 of FIG. 2.

In operation, the orbital packing fingers can move at a speed considerably higher than that previously available from reciprocating devices because of the completely balanced construction. Further, the inventive packing device produces a much more gentle action in delivering the webs from the face of the vacuum roll, since at the time of delivery the fingers 17 are moving out of the annular grooves 19 at a gradually decelerating rate of movement (considered in the components parallel with the length of the ways 18—in the illustration given, the horizontal component of movement). This is in direct contrast to the previous reciprocating devices, which are decelerating very rapidly at the time of packing.

While in the foregoing specification a detailed description of an embodiment of the invention has been set down for the purpose of illustration, many variations in the details herein given may be made by those skilled in the art without departing from the spirit and scope of the invention.

I claim:

1. In apparatus for the sequential handling of discrete pieces of flexible web material, a frame, a vacuum roll journaled in said frame, means for rotating said roll, means on said frame for sequentially delivering discrete pieces of web material to said roll for travel therewith, said roll being equipped with annular grooves coupled to a source of vacuum for urging said pieces against said roll, a cross shaft mounted on said frame exteriorly of said roll for oribtal movement adjacent said roll, means for obiting said shaft, and a plurality of fingers secured to said shaft and extending into said grooves for removing said pieces sequentially therefrom.

2. The structure of claim 1 in which said roll extends generally horizontally and said frame is equipped with an elongated piece-receiver also extending generally horizontally and having one end positioned adjacent said roll, said fingers extending generally vertically, said shaft being positioned relative to said roll to decelerate said fingers in a horizontal direction as said fingers approach the periphery of said roll adjacent said receiver.

References Cited

The following references, cited by the Examiner, are of record in the patented file of this patent or the original patent.

UNITED STATES PATENTS

| | | | |
|---|---|---|---|
| 700,239 | 5/1902 | Read | 271—71 |
| 2,031,136 | 2/1936 | Sewick | 271—80 |
| 2,184,229 | 12/1939 | Spiess | 271—27 |
| 2,595,464 | 5/1952 | Kaufmann | 74—603 X |
| 3,122,295 | 2/1964 | Davison | 226—95 X |

FOREIGN PATENTS

| | | | |
|---|---|---|---|
| 893,953 | 10/1953 | Germany | 271—81 |

EVON C. BLUNK, Primary Examiner

B. H. STONER, Jr., Assistant Examiner

U.S. Cl. X.R.

271—DIG. 2 Doc.